United States Patent
Sasaki

(10) Patent No.: US 7,593,297 B2
(45) Date of Patent: Sep. 22, 2009

(54) INFORMATION REPRODUCING METHOD AND APPARATUS

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 11/508,536

(22) Filed: Aug. 22, 2006

(65) Prior Publication Data

US 2006/0280432 A1    Dec. 14, 2006

Related U.S. Application Data

(63) Continuation of application No. 11/185,275, filed on Jul. 19, 2005, which is a continuation of application No. 10/789,235, filed on Feb. 27, 2004, now Pat. No. 6,958,960, which is a continuation of application No. 09/884,210, filed on Jun. 19, 2001, now Pat. No. 6,711,106.

(30) Foreign Application Priority Data

Jun. 20, 2000    (JP)    ............... 2000-185120

(51) Int. Cl.
G11B 5/09    (2006.01)
(52) U.S. Cl. .................. 369/47.36; 369/47.1; 369/59.1
(58) Field of Classification Search ........... None
See application file for complete search history.

(56) References Cited

U.S. PATENT DOCUMENTS

| | | | |
|---|---|---|---|
| 5,097,459 A | 3/1992 | Yoshio | |
| 5,572,335 A | 11/1996 | Stevens | |
| 5,659,799 A | 8/1997 | Wu et al. | |
| 5,802,026 A | 9/1998 | Tsukihashi | |
| 5,805,548 A * | 9/1998 | Ishihara et al. | 369/47.43 |
| 5,870,363 A | 2/1999 | Sun et al. | |
| 5,982,726 A | 11/1999 | Ro et al. | |
| 6,061,732 A | 5/2000 | Korst et al. | |
| 6,122,235 A | 9/2000 | Arai | |
| 6,154,428 A | 11/2000 | Lee | |
| 6,404,771 B1 | 6/2002 | Gulick | |
| 6,523,142 B1 | 2/2003 | Igari et al. | |
| 6,711,106 B2 | 3/2004 | Sasaki | |
| 6,958,960 B2 | 10/2005 | Sasaki | |
| 2005/0008341 A1 | 1/2005 | Yada et al. | |

FOREIGN PATENT DOCUMENTS

| | | |
|---|---|---|
| JP | 61-170959 | 1/1986 |
| JP | 61-21725 | 5/1986 |
| JP | 3-150765 | 6/1991 |
| JP | 4-134526 | 5/1992 |
| JP | 7-7580 | 1/1995 |
| JP | 8-77691 | 3/1996 |
| JP | 8-241172 | 9/1996 |
| JP | 8-255414 | 10/1996 |
| JP | 2570004 | 1/1997 |
| JP | 11-58738 | 3/1999 |

(Continued)

*Primary Examiner*—Muhammad N. Edun
(74) *Attorney, Agent, or Firm*—Cooper & Dunham, LLP

(57) ABSTRACT

An information reproducing method includes the steps o of reading information from an information medium that is rotated, and determining a rotation velocity of the information medium on the basis of a data transfer rate based on a specification of a read request.

2 Claims, 10 Drawing Sheets

FOREIGN PATENT DOCUMENTS

| | | |
|---|---|---|
| JP | 11-66702 | 3/1999 |
| JP | 11-110903 | 4/1999 |
| JP | 2954055 | 9/1999 |
| JP | 11-306661 | 11/1999 |
| JP | 2000-90608 | 3/2000 |
| JP | 2000-119438 | 4/2000 |
| JP | 2000-132901 | 5/2000 |
| JP | 2000-260108 | 9/2000 |
| JP | 2001-45419 | 2/2001 |
| JP | 2001-307411 | 11/2001 |

* cited by examiner

INFORMATION REPRODUCING METHOD AND APPARATUS

CROSS-REFERENCE TO RELATED APPLICATION

This application is a Rule 1.53(b) Continuation of U.S. Ser. No. 11/185,275, filed Jul. 19, 2005, which is a continuation of U.S. application Ser. No. 10/789,235, filed Feb. 27, 2004, now U.S. Pat. No. 6,958,960, issued Oct. 25, 2005, which is a continuation of application Ser. No. 09/884,210, filed Jun. 19, 2001, now U.S. Pat. No. 6,711,106, issued Mar. 23, 2004, the entire contents of each of which are incorporated by reference herein.

BACKGROUND

1. Technical Field

This disclosure relates to an information reproducing apparatus and method, and more particularly, to an information reproducing apparatus and method for reproducing AV (audio Visual) data recorded on an information recording medium rotationally driven, such as a CD-ROM disc, a CD-R disc or a CD-RW disc.

2. Description of the Related Art

An effort has been made to improve the read rate of an information reproducing apparatus that reads information from an information medium rotated, such as a CD-ROM disc, CD-R disc or a CD-RW disc. On the other hand, such an information reproducing apparatus has problems to be resolved, such as noise because of high-speed rotation of the disc and power consumption.

For example, as the data read rate goes up, noise caused by vibration due to rotation and power consumption become more conspicuous at the time of reproducing AV data recorded on a music CD (CD-RA), a video CD or CD as a WAV file or MP3 file through USB speakers installed in a computer. The WAV file is a most popular audio file format handled by Windows that is an OS of Microsoft and has an extension "wav". The MP3 file is the name of a standardized audio compression technique and has an extension "mp3", wherein MP is an abbreviation of MPeg audio layer 3.

There is an increased possibility that data may be erroneously read more frequently due to crack or dusk as the disc rotates faster.

However, generally, AV data recorded on a disc such as music data, video data and WAV data, is reproduced at an average transfer rate approximately equal to a single multiple. MP data is reproduced at an average transfer rate approximately equal to one tenth of that for AV data. That is, it takes a much longer time to read AV data and MP data than ordinary data. This does not need to rotate the disc fast.

An improved information reproducing apparatus directed to resolving the above problems has been proposed. In the improved apparatus, data that does not need an error correction mechanism, such as music CDs and some video CDs, is read at a given lowered reproduction rate. However, since the reproduction rate is lowered unconditionally, data cannot be read fast in data ripping or a similar situation required to read data fast. An error correction function is added to WAV data and MP3 data, which will be subject to high-rate read operation in the above-mentioned proposal. Thus, WAV data and MP3 cannot be read at the given lowered reproduction rate.

Japanese Unexamined Laid-Open Publication No. 2000-132901 proposes a disc apparatus capable of controlling the read rate. The proposal shown in this publication analyzes a disc revolution corresponding to the transfer rate of a file to be read, more specifically, the type of data (such as type of file and file size), and thus determines the optimal read rate. The proposal avoids necessity of a requirement for always reading data at the maximum rate, and is therefore preferable in terms of read rate, vibration/noise and power consumption when totally viewed.

However, the technique disclosed in the above publication does not satisfy a request such that the same file is read at different reproduction rates because the unique disc revolution (read rate) is automatically defined based on the type of data to be read (type of file or file size). For example, the proposed technique does not meet different requests for reading data of the same WAV file (for example, WAV reproduction and data ripping).

SUMMARY

There is provided in this disclosure an information reproducing method and apparatus using an information recording medium that is driven rotationally, wherein data can be read at a data transfer rate based on a user's read request.

According to a first aspect of this disclosure, an information reproducing method comprises the steps of: reading information from an information medium that is rotated; and determining a rotation velocity of the information medium on the basis of a data transfer rate based on a specification of a read request. Similarly, an information reproducing apparatus comprises: a motor rotating an information medium; an optical pickup reading information from the information medium; and a part determining a rotation velocity of the information medium on the basis of a data transfer rate based on a specification of a read request.

The transfer rate at which data is read is based on the specification of the read request which may be supplied from a user. The data read rate is defined by a rotation velocity of the information medium. The higher the rotation velocity, the higher the read rate, and the lower the rotation velocity, the lower the read rate. Thus, by determining the rotation velocity in accordance with the data transfer rate based on the specification of the read request, the rotation velocity of the information medium may be lowered in a case that a low data transfer rate is acceptable, for example, a case where AV data is retrieved. This avoids reading data at an excessively high bit rate and contributes to reduction of noise and power consumption because of high-speed rotation. Even for AV data, if it is requested to data in ripping, the rotation velocity may be raised to the upper limit. Thus, data can be read at the maximum bit rate.

According to a second aspect of this disclosure, an information reproducing method comprises the steps of: reading information from an information medium that is rotated; and measuring an average transfer rate in data read and lowering a rotation velocity of the information medium if the average transfer rate measured is equal to or lower than a predetermined threshold value. Similarly, an information reproducing apparatus comprises: a motor rotating an information medium; an optical pickup reading information from the information medium; a measuring part measuring an average transfer rate in data read; a comparing part comparing the average transfer rate measured with a predetermined threshold value; and a rotation velocity control part lowering a rotation velocity of the information medium by the motor if a result of comparison shows that the average transfer rate measured is equal to or lower than a predetermined threshold value.

Although the second aspect is basically the same as the first aspect thereof, the second aspect may be preferably applied to a specification of the read request in which AV data such as music CD is retrieved. In such retrieval, the average transfer rate of reading data is much lower than that in ordinary data read. Thus, the average transfer rate is measured and is compared with the predetermined threshold value. If the average transfer rate is equal to or lower than the predetermined threshold value, the rotation velocity is lowered. Thus, AV data such as music CD can preferably be read.

According to a third aspect of this disclosure, an information reproducing method comprises the steps of: reading information from an information medium that is rotated; and measuring an average transfer rate in data read and raising a rotation velocity of the information medium if the average transfer rate measured is greater than a predetermined threshold value. Similarly, an information reproducing apparatus comprises: a motor rotating an information medium; an optical pickup reading information from the information medium; a measuring part measuring an average transfer rate in data read; a comparing part comparing the average transfer rate measured with a predetermined threshold value; and a rotation velocity control part raising a rotation velocity of the information medium by the motor if a result of comparison shows that the average transfer rate measured exceeds a predetermined threshold value.

Although the third aspect is basically the same as the first aspect thereof, the third aspect may be preferably applied to a specification of the read request in which AV data such as music CD is ripped. In such a specification, it is required that data is read at a high average transfer rate. Therefore, the measured average transfer rate exceeds the predetermined threshold value, the rotation velocity of the information medium is raised, so that data can be ripped at a high bit rate.

According to a fourth aspect of this disclosure, an information reproducing method comprises the steps of: reading information from an information medium that is rotated; measuring an average transfer rate in data read and raising a rotation velocity of the information medium if the average transfer rate measured is greater than a predetermined threshold value; and lowering the rotation velocity if the average transfer rate is equal to or lower than the predetermined threshold value. Similarly, an information reproducing apparatus comprises: a motor rotating an information medium; an optical pickup reading information from the information medium; a measuring part measuring an average transfer rate in data read; a comparing part comparing the average transfer rate measured with a predetermined threshold value; and a rotation velocity control part lowering a rotation velocity of the information medium by the motor if a result of comparison shows that the average transfer rate measured is equal to or lower than a predetermined threshold value and raising the rotation velocity if the result of comparison shows the average transfer rate measured exceeds the predetermined threshold value.

There is a case where the user requests to alternately read reproduction of AV data and ripping thereof from the same information medium. The average transfer rate is constantly measured while data is being read, and the rotation velocity of the information medium is switched to the low-speed side or high-velocity side with respect to the threshold value serving as a boundary. Thus, the information medium is rotated at a low velocity in retrieval of AV data and is rotated at a high velocity in ripping of data. It is therefore possible to suppress occurrence of a problem such as noise and read error in reproduction of AV data and rip data at a high bit rate.

According to a fifth aspect of this disclosure, the information reproducing method may be configured so that it further comprises the steps of: monitoring whether the read request is issued; and restarting measurement of the average transfer rate if the read request is not issued for a predetermined time in measurement of the average transfer rate. The apparatus may be configured similarly.

The measurement of the transfer rate is performed without discriminating AV data files and ordinary-data-files over each other. In order to avoid reading an ordinary data file at a lowered bit rate or avoid interruption of sound or video because of changing the bit rate to the maximum rate during reproduction of AV data, it is necessary to accurately measure the average transfer rate of reading data. For example, in a case where a read request from the user is temporarily interrupted and ripping of data is restarted in the reading of an ordinary data file, there is a tendency for the measured average transfer rate to be lower than the actual rate. In this regard, generally, the read request from the user tends to be periodically issued at the time of retrieving AV data. This may be a factor for determining whether AV data is being reproduced. That is, the AV data read request is periodically issued to some extent, although this depends on how an application reads data. On the other hand, generally, ordinary data file is read at random and irregularly. In addition, the read process is interrupted when the user does not operate. With the above in mind, the reading is deemed to be the reading of an ordinary data file if the read request is not issued for the predetermined time, and the measurement of the average transfer rate is restarted. This improves the precision of measurement. It is therefore possible to avoid interruption of sound or video because of changing the rate to the maximum level during retrieval of AV data. That is, it is possible to appropriately distinguish reproduction of AV data files over reproduction of ordinary data files.

According to a sixth aspect of this disclosure, the information reproducing method may be configured so that it further comprises the steps of: monitoring a read address of the read request; and restarting measurement of the average transfer rate if the read address is arranged in a formation other than an increasing order. The information reproducing apparatus may be configured similarly.

The measurement of the transfer rate is performed without discriminating AV data files and ordinary data files over each other. In order to avoid reading an ordinary data file at a lowered bit rate or avoid interruption of sound or video because of changing the bit rate to the maximum rate during reproduction of AV data, it is necessary to accurately measure the average transfer rate of reading data. For example, in a case where a read request from the user is temporarily interrupted and ripping of data is restarted in the reading of an ordinary data file, there is a tendency for the measured average transfer rate to be lower than the actual rate. In this regard, generally, in reproduction of AV data, the read address in the read request from the user is arranged in the increasing order. This may be a factor for determining whether AV data is being reproduced. With the above in mind, the reading is deemed to be the reading of an ordinary data file if the address is not arranged in the increasing order, and the measurement of the average transfer rate is restarted. This improves the precision of measurement. It is therefore possible to avoid interruption of sound or video because of changing the rate to the maximum level during retrieval of AV data. That is, it is possible to appropriately distinguish reproduction of AV data files over reproduction of ordinary data files.

According to a seventh aspect of this disclosure, the information reproducing method may be configured so that it further comprises the steps of: determining validity of the average transfer rate on the basis of average transfer rates obtained a number of times of measurement; and validating the average transfer rate if the average transfer rates obtained a number of times of measurement are close to each other. The information reproducing apparatus may be configured similarly.

There is a specific application in which, when the user designates a reproduction skip during retrieval of AV data at a low rotation velocity, data involved in the skip is read at one time and is stored in a buffer memory of a host. In such an application, the average transfer rate will be temporarily raised so that the rotation velocity is unwillingly raised to the maximum level whereby sound of AV data may be interrupted or video may be stopped. In this regard, the average transfer rates of one set obtained by measurement performed several times are nearly equal to each other, the average transfer rate (which may, for example, be one of the nearly equal rates) is validated. That is, the valid average transfer rate is defined based on condition that the average transfer rates obtained several times are close to each other. This improves the reliability of the average transfer rate and copes with a temporary change of the transfer rate such that the average transfer rate is temporarily raised due to the application.

According to an eighth aspect of this disclosure, the information reproducing method may be configured so that a first threshold value which is one of said predetermined threshold value and is used for raising the rotation velocity of the information medium is greater than a second threshold value which is another one of said predetermined threshold value and is used for lowering the rotation velocity of the information medium. The information reproducing apparatus may be configured similarly.

There is a possibility that lowering and raising of the rotation speed of the information medium may be repeatedly performed at the time of reading at a transfer rate close to the threshold value although the data transfer rate requested by the user is close to the threshold value for switching the rotation velocity of the information medium. This possibility can be avoid by setting the first threshold value greater than the second threshold value.

According to a ninth aspect of this disclosure, the information reproducing method may be configured so that it further comprises the steps of: temporarily storing information read from the information medium in a cache memory; pre-reading information if a space is available in the cache memory; and causing measurement of the average transfer rate to be initiated when the cache memory is full of data and the pre-reading of information is completed in a case where information is read from the information medium at a maximum rate.

In a case where information is read at the maximum rate, measurement of the average transfer rate is started at the time when a cache memory becomes full of data and the data pre-reading process is completed. It follows that there is no need to measure the average transfer rate meaninglessly while information is being read at the maximum rate and that degradation of the performance in the read process can be avoided. At the time of reproducing AV data or the like, the average transfer rate is originally low, and the pre-reading process is completed after the cache memory is full of data. Hence, measurement of the transfer rate is initiated as it stands.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

A description will now be given, with reference to FIGS. 1 through 3, of an embodiment of the present invention.

Figure 1:
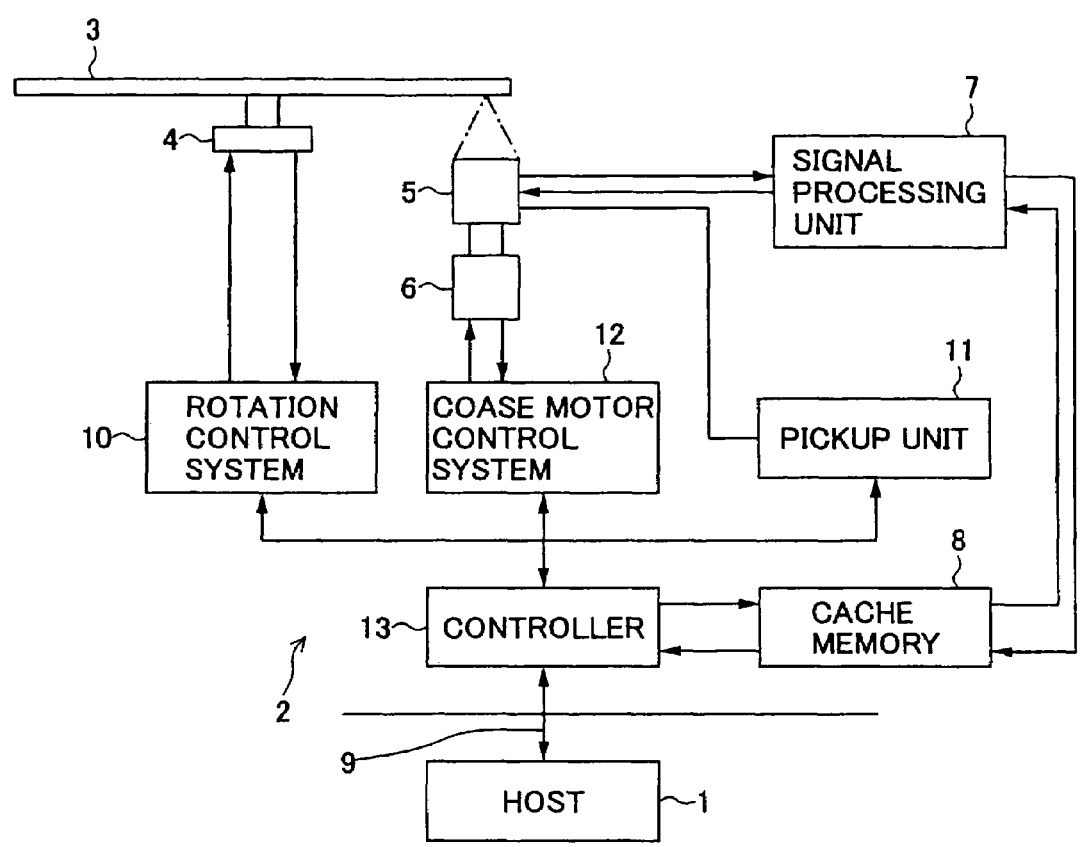
FIG. 1 is a schematic block diagram of an optical disc drive according to an embodiment of the present invention.
Figure 2:
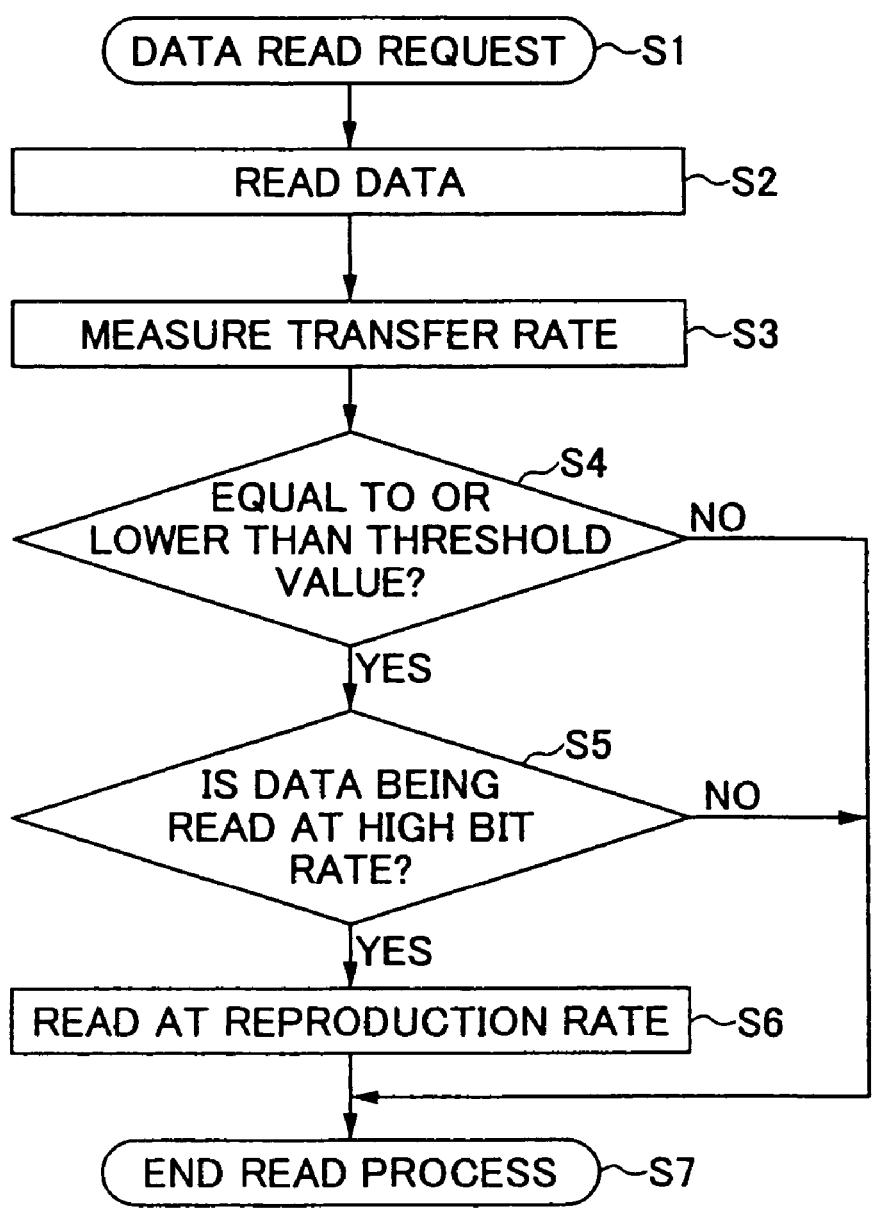
FIG. 2 is a flowchart of a read process control of the optical disc drive shown in FIG. 1.

FIG. 1 is a schematic block diagram of a structure of an information reproducing apparatus according to an embodiment of thee present invention. The apparatus illustrated in FIG. 1 is an optical disc drive 2, which may be installed integrally with or separate from a host 1 such as a personal computer. An information recording medium 3 stores AV data and may, for example, be a CD-ROM for storing data, a music CD (CD-DA), a video CD, or AV data recorded on a CD such as a WAV file or MP3 file. The optical disc drive 2 is configured as a system capable of reproducing the AV data as audio through USB speakers installed in the host 1 or as video on a display and ripping data from a memory.

The information recording medium 3 is rotationally driven by a spindle motor 4. An optical pickup 5 condenses a laser light and projects it onto the information medium 3 driven by the spindle motor 4. The optical pickup 5 is provided in such a way as to be free to seek in the radial direction of the medium 3 by means of a coarse motion motor 6. The optical pickup 5 includes a semiconductor laser emitting a laser light, an objective lens for condensing the laser diode, and a light-receiving/sensing system for receiving a reflected light from the information medium 3 and sensing a reproduced signal and various signals. The reproduced signal (read signal) sensed by the light receiving/sensing system of the optical pickup 5 is processed by a signal processing system 7, and is then stored in a cache memory 8 temporarily. Then, the reproduced signal is transferred to the host 1 via an external interface 9. The spindle motor 4, the optical pickup 5 and the coarse motion motor 6 are respectively equipped with control systems 10, 11 and 12, which are controlled by a controller 13 having a microcomputer configuration. The cache memory 8 is also controlled by the controller 13. In addition to the above control, the controller 13 is responsible for various controls including analyzing of a user's read request received via the host 1 and the data transfer rate, and realizes various functions that will be described later.

A description will be given, with reference to the flowchart of FIG. 2, of a read process control executed by the controller 13 upon receipt of a data read request from a user via the host 1.

When a data read request is received (step S1), the information recording medium 3 is rotated at a given velocity by the spindle motor 4 under the control of the rotation control system 10, and a process of reading data from the information medium 3 by the optical pickup 5 is initiated (step S2). Read data is sequentially stored in the cache memory 8, and is then transferred to the host 1 via the external interface 9. The average transfer rate of the above transfer is measured (step S3). The process of step S3 is executed as a function of measuring means. The average transfer rate is compared with a predetermined threshold value (step S4). The process of step S4 is executed as a function of comparing means. The comparison results shows that the average transfer rate is higher than the threshold value (N of step S4), the read process is caused to continue at the present rotation velocity, and the read process ends (step S7).

In contrast, if the average transfer rate is equal to or lower than the threshold value (Y of step S4), it is determined whether the current rotation velocity is equal to the maximum velocity (step S5). If the answer is NO, the read process continues at the current velocity and the read process ends (step S7). In contrast, if the read process is being performed at the maximum velocity (Y of step S5), the rotation velocity of the information medium 3 is lowered to the predetermined reproduction rate at which data is read (step S6). Then, the process ends (step S7). The process of step S6 is executed as a function of rotation velocity control means for reducing the velocity of the information medium 3.

Figure 3:
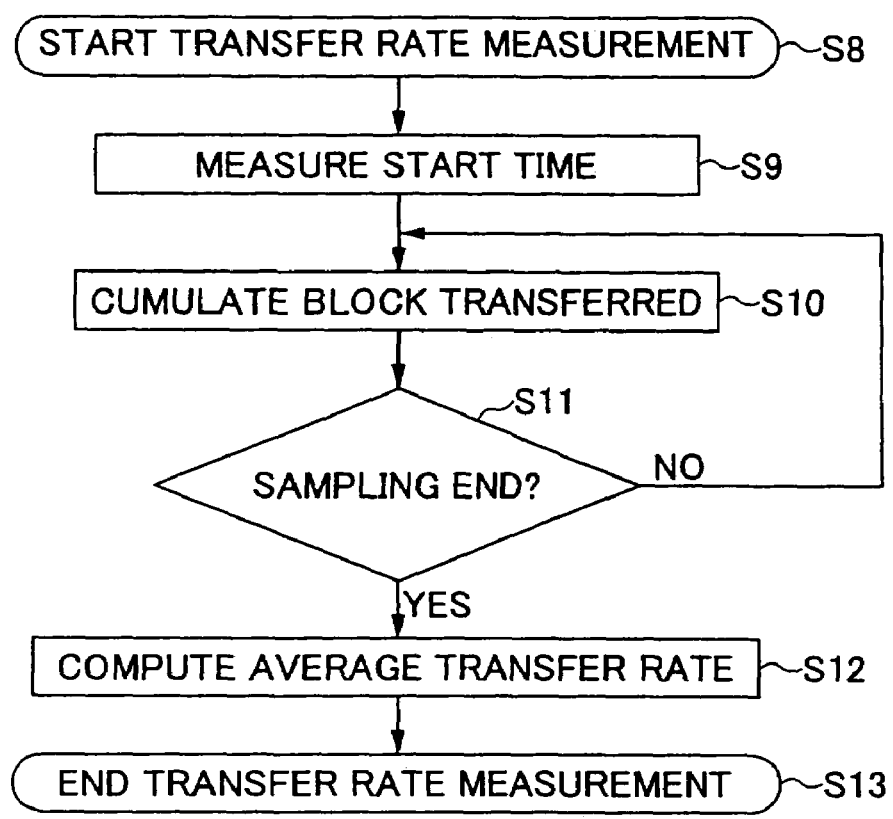
FIG. 3 is a flowchart of a transfer rate measurement process of the optical disc drive shown in FIG. 1.

An example of the process for measuring the average transfer rate at step S3 is shown in FIG. 3. After measurement of the average transfer rate is started (step S8), the measurement starting time is measured (step S9). Then, the number of blocks transferred to the host via the external interface 9 in response to the read request from the user is cumulated (step S10). Thereafter, it is determined whether the cumulative number of blocks (the number of blocks sampled) has reached a predetermined number of blocks (S11). If the cumulative number of blocks has not yet reached the predetermined number of samples (N of step S11), the sampling continues (Step S10). In contrast, if the cumulative number of blocks has reached the predetermined number of blocks (Y of step S11), the average transfer rate is computed from the transfer rate measuring time starting from the start time and the number of blocks (step S12). Then, the measurement of the average transfer rate is finished (step S13).

The average transfer rate is employed in the present embodiment taking into account the following. Even when the same file is read, the file may be read at different transfer rates based on the specification of the user's read request given via the host 1. The measurement of the average transfer rate is used to make a decision as to whether data should be read at a low bit rate or the maximum bit rate in accordance with the specification of the read request. For example, when a read request for WAV reproduction of a WAV file is given by the user, the rotation velocity is lowered to the predetermined reproduction bit rate (step S6) if the disc is being rotated at the maximum velocity, because the data transfer to the host 1 is performed at a comparatively low bit rate (Y of steps S3 and S4). This will make it possible to avoid WAV reproduction from being carried out an excessively high bit rate. As a result of such avoidance, it is possible to resolve the problems about noise and power consumption due to high-speed rotation and reduce the possibility that data may be erroneously read. On the other hand, when the same WAV file is requested to be read in ripping, high-rate processing can be performed because the data transfer rate to the host 1 is very high (N of Steps S3 and S4). Hence, the maximum performance of the optical disc drive 2 can be utilized.

Figure 4:
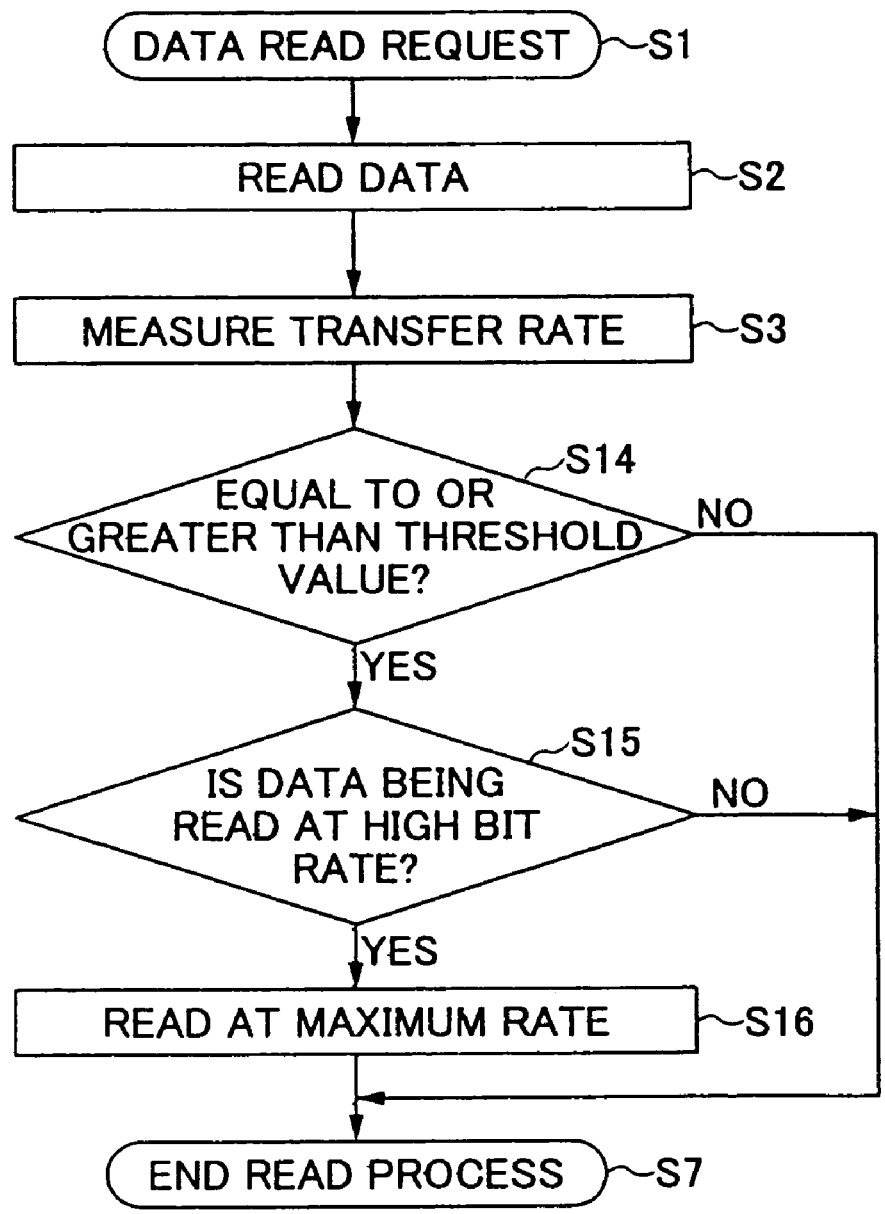
FIG. 4 is a flowchart of a read process control according to a second embodiment of the present invention.

A description will be given, with reference to FIG. 4, of a second embodiment of the present invention. Parts that are the same as those of the first embodiment of the present invention are given the same reference numbers, and a description thereof will be omitted (each of the other embodiments of the present invention is handled similarly).

A data read request from the user is received (S1), and reading of data is started (S2). Then, the average transfer rate is measured (S3), and it is determined whether the average transfer rate is equal to or higher than the predetermined threshold value (S14). The process of step S14 is executed as a function of the comparing means. If the comparison result shows that the average transfer rate is lower than the predetermined threshold value (N of S14), the read operation on the information medium 3 continues without changing the bit rate, and ends (S7). In contrast, if the average transfer rate is equal to or higher than the threshold value (Y of S14), it is determined whether data is being read at the predetermined reproduction rate (S15). If the answer is negative (N of S15), the read operation continues and ends (S7). On the other hand, if data is being read at the predetermined reproduction rate (Y of S15), the read rate is raised to the maximum rate, and the read process ends (S7). The process of step S16 is executed as a function of rotation velocity control means for raising the rotation velocity of the information medium 3.

Thus, according to the second embodiment of the present invention, if the user's read request specifies data ripping on an information medium on which AV data is recorded, such as a music CD, it is required to read data at a high average transfer rate. Therefore, the average transfer rate is measured by the measuring means. If the average transfer rate is higher than the predetermined threshold value (Y of S14), the rotation velocity of the information medium is raised to the upper limit by the rotation velocity control means (S16). Thus, data ripping can be performed at high rate with the maximum performance of the information reproducing apparatus.

Figure 5:
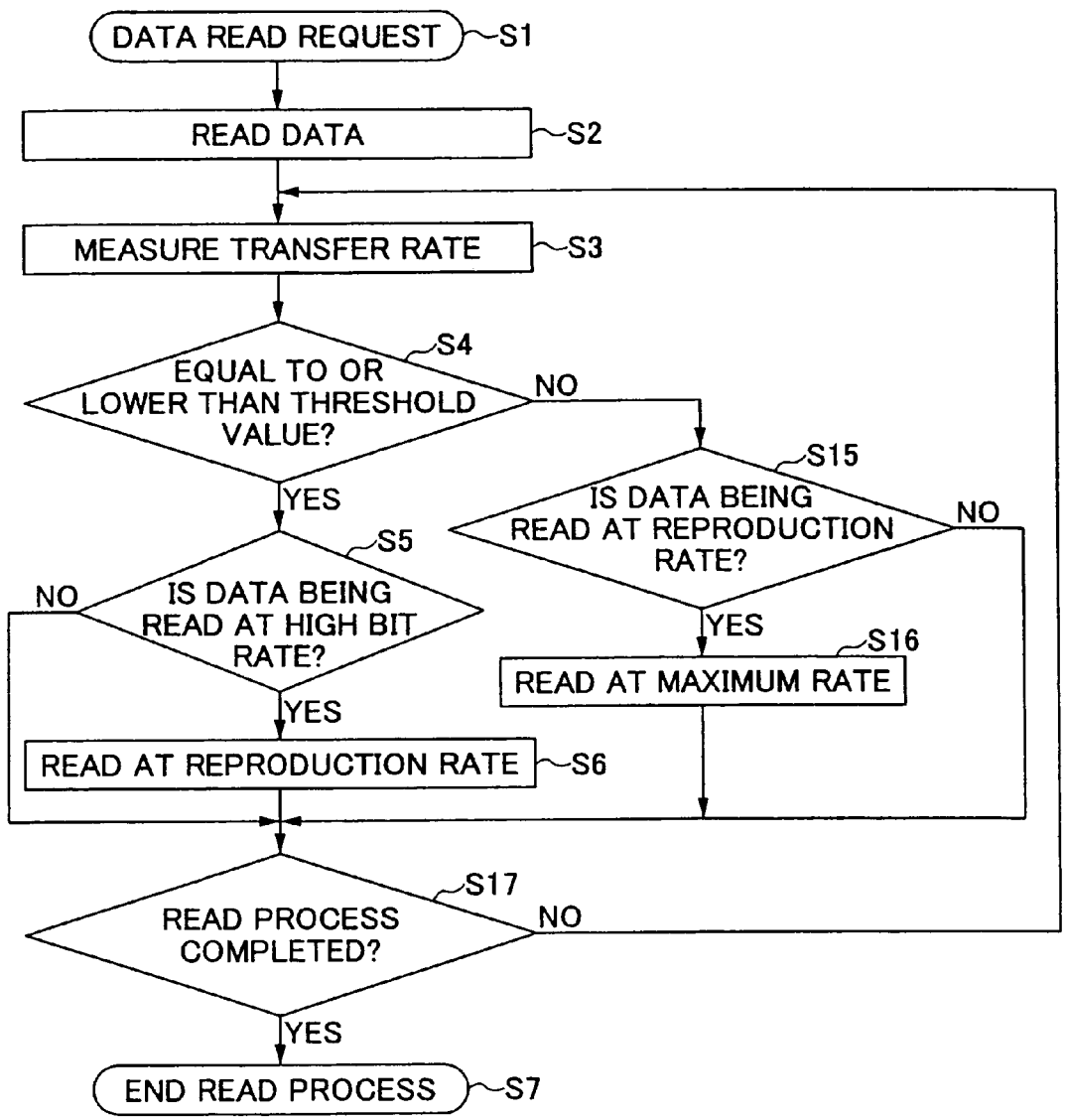
FIG. 5 is a flowchart of a read process control according to a third embodiment of the present invention.

A description will now be given, with reference to FIG. 5, of a third embodiment of the present invention, which primarily corresponds to a combination of the first and second embodiments of the present invention.

A data read request from the user is received (S1), and reading of data is started (S2). Then, the average transfer rate is measured (S3), and it is determined whether the average transfer rate is equal to or lower than the predetermined threshold value (S4). If the comparison result shows that the average transfer rate is lower than the predetermined threshold value (Y of S4), it is determined whether the current read rate is equal to the maximum rate (S5). If data is not being read at the maximum rate (N of S5), data is continuously read at the same rate. In contrast, if data is being read at the maximum rate (Y of S5), the read rate is lowered to the given reproduction rate (S6).

On the other and, if the average transfer rate exceeds the given threshold value (N of S4), it is determined whether the current read rate is equal to the predetermined reproduction rate (S15). If data is not being read at the predetermined reproduction rate (N of S15), data is read at the same read rate. In contrast, if data is being read at the predetermined reproduction rate (Y of S15), the read rate is raised to the maximum read rate (S16). Then, if the read process is completed (S17), the transfer rate is continuously measured (S3). If the read process is completed, the process ends (S7).

Thus, for instance, as to the same recording medium 3 on which AV data is recorded, reproduction of AV data and ripping of AV data may be alternately requested. According to the third embodiment of the present invention, the average transfer rate is constantly measured by the measuring means while data is being read (S3). The comparison result is compared with the threshold value (S4), and the rotation velocity of the information medium 3 is switched to the low-speed side or high-speed side with reference to the threshold value serving as a boundary by the rotation velocity control means (S6, S16). Thus, data can be reproduced at a comparatively low velocity of the information medium, while ripping of data can be performed at a comparatively high velocity. This makes it possible to suppress occurrence of noise and data read error at the time of reproducing AV data and to bring out the maximum performance of the information reproducing apparatus at the time of ripping data.

Figure 6:
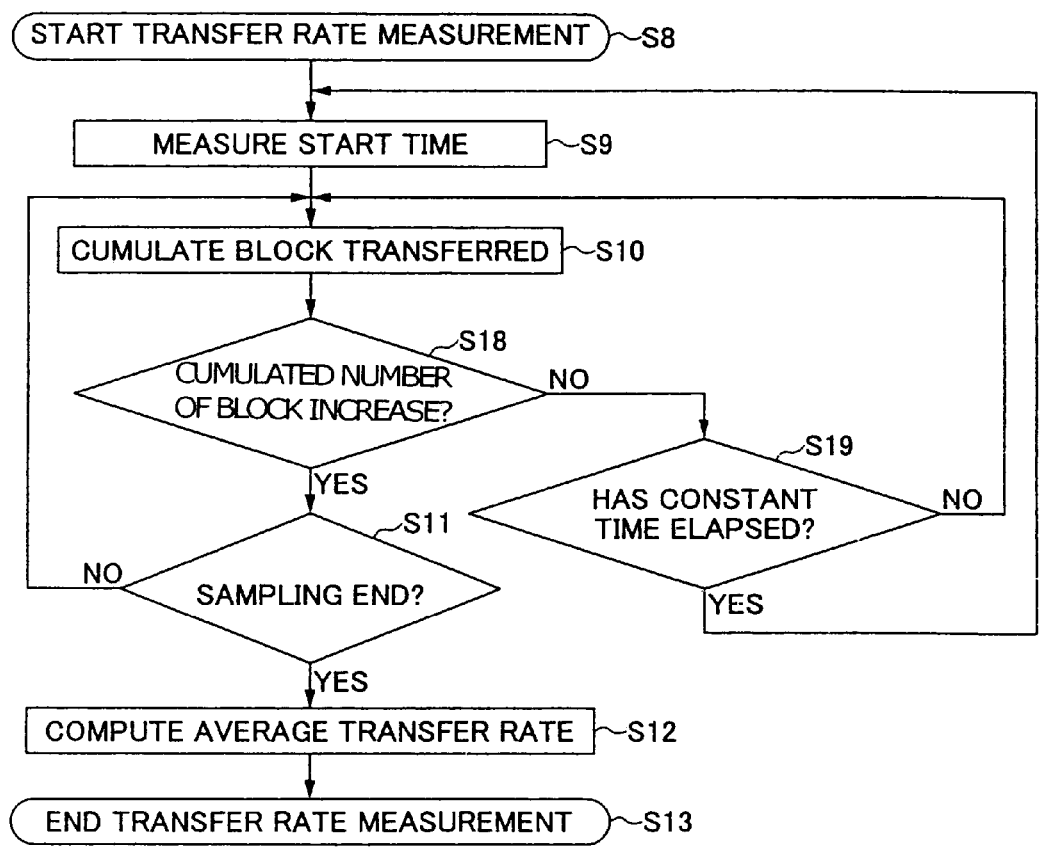
FIG. 6 is a flowchart of a transfer rate measurement process according to a fourth embodiment of the present invention.

A description will be given, with reference to FIG. 6, of a fourth embodiment of the present invention, which is taken into consideration the following. When AV data is reproduced, generally, the data read request is frequently issued. In this regard, reproduction of AV data is different from that of an ordinary data file. With the above in mind, the fourth embodiment is directed to improving the process of measuring the average transfer rate necessary to realize the first through third embodiments of the present invention.

When the measurement of the average transfer rate is started (S8), the measurement start time is measured (S9). Then, the number of blocks transferred to the host 1 upon read requests from the user is cumulated (S10). After a given time, it is determined whether the cumulated number of blocks (the number of sampled blocks) increases (S18). If the number of sampled blocks does not increase (N of S18), it is determined whether a predetermined constant time has lapsed (S19). If the answer is NO (N of S19), transferred blocks are continuously sampled (S10). In contrast, if the predetermined constant time has lapsed (Y of S19), the measurement of the transfer rate is newly started (S9). That is, the processes of steps S18 and S19 are executed as a function of monitor means, and the processes of steps S19 and S9 are executed by a function of re-measurement means. Therefore, blocks are cumulated by a predetermined number of blocks. When the sampling is completed (Y of S11), the average transfer rate is computed from the transfer rate measurement time starting from the start time and the number of blocks transferred (S12). Then, the measurement of the average transfer rate is ended (S13).

That is, the measurement of the transfer rate is performed without discrimination between AV data files and ordinary data files. In order to avoid reading an ordinary data file at a low rate and a problem such that sound is interrupted due to change of the rate to the maximum rate during reproduction of AV data in the first through third embodiments of the present invention, it is necessary to accurately measure the average transfer rate of data read at step S3. For example, the average transfer rate actually measured tends to be lower than the true rate in a case where the data read request from the user is temporarily interrupted and read of the involved data file is restarted in the ordinary operation of reading data files. In this regard, generally, the read request from the user tends to be periodically issued at the time of retrieving AV data. This may be a factor for determining whether AV data is being reproduced. That is, the AV data read request is periodically issued to some extent, although this depends on how an application reads data. On the other hand, generally, ordinary data file is read at random and irregularly. In addition, the read process is interrupted when the user does not operate.

With the above in mind, according to the fourth embodiment of the present invention, in the measurement of the average transfer rate at step S3, if the read request is not received for a predetermined time (N of S18, Y of S19), the reading is deemed to be the reading of an ordinary data file, and the measurement of the average transfer rate is restarted (Y of S19, S9). This improves the precision of measurement. It is therefore possible to avoid interruption of sound or video because of changing the rate to the maximum level during retrieval of AV data. That is, it is possible to appropriately distinguish reproduction of AV data files over reproduction of ordinary data files.

Figure 7:
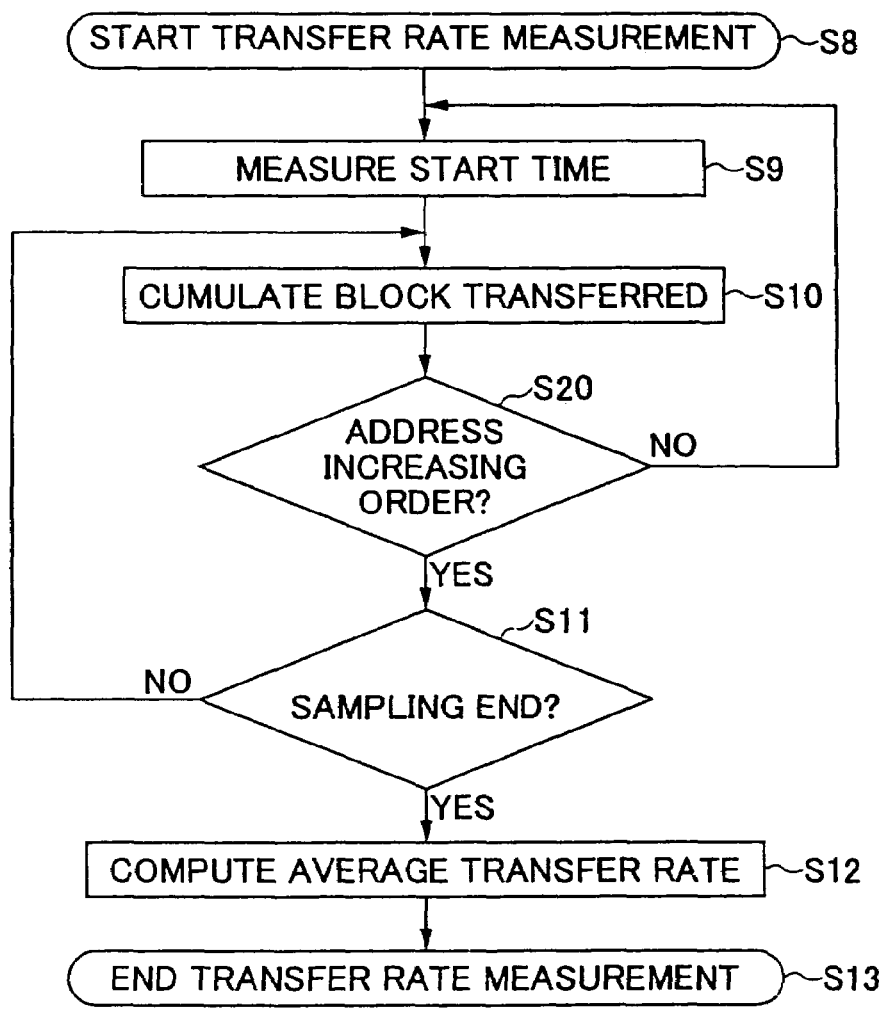
FIG. 7 is a flowchart of a transfer rate measurement process according to a fifth embodiment of the present invention.

A description will be given of a fifth embodiment of the present invention by referring to FIG. 7. This embodiment takes into account a general tendency for the data read request from the user to be issued in increasing order of address, which is different from that for the reading of ordinary data files. Based on the above consideration, the fifth embodiment attempts to improve the precision of the measurement of the average transfer rate necessary for realizing the first through third embodiments of the present invention.

After the measurement of the average transfer rate is started (S8), the number of blocks transferred to the host 1 by the read request from the user is counted (S10). Then, it is determined whether the read address is issued in the increasing order of decreasing order (S20). If the read address is not arranged in the increasing order (N of S20), the transfer rate measurement is newly started (S9). In contrast, if the read address is arranged in the increasing order (Y of S20), the sampling is continuously performed, and it is determined whether the cumulative number of blocks reaches the predetermined number of transferred blocks (S11). That is, the process of step S20 is executed as a function of monitoring means, and the processes of Y of S20 and S9 are executed as a function of measurement restart means. If the sampling has not been completed by the predetermined number of transferred blocks (N of S11), the sampling is continuously performed (S10). In contrast, if the sampling is completed (Y of S11), the average transfer rate is computed on the basis of the transfer rate measurement time from the start time and the number of transferred blocks (S12). Then, the measurement of the transfer rate is ended (S13).

As described above, the transfer rate is measured without discriminating the AV data files and ordinary data files. In order to avoid a problem that may be encountered in the first through third embodiments of the present invention in which the ordinary data file is read at a low rate or sound or video is interrupted because of changing the rate to the maximum during retrieval of AV data, it is necessary to accurately measure the average transfer rate for reading data at step S3. For example, the average transfer rate actually measured tends to be lower than the true rate in a case where the data read request from the user is temporarily interrupted and read of the involved data file is restarted in the ordinary operation of reading data files. In this regard, generally, the read address from the user is arranged in the increasing order at the time of reproducing AV data. This tendency may be a factor for determining whether AV data is being reproduced. For example, in an audio disc, data is sequentially arranged from the inner circumference thereof to the outer circumference. Generally, a similar arrangement is made for video data, WAV data and MP3 data. These kinds of data are read in the increasing order of the address. That is, when a length Y is read from address X by a read request from the user, the next read address is (X+Y). In contrast, when an ordinary data file is read, the address involved in the request is at random. For example, file information may be read or the file body may be read.

Taking into account the above, according to the fifth embodiment of the present invention, in the measurement of the average transfer rate at step S3, if the address of the read request is not arranged in the increasing order (N of S20), it is judged that the reading is that of an ordinary data file and the measurement of the average transfer rate is restarted (S9). Thus, it is possible to avoid interrupt of sound or video because of changing to the maximum rate during retrieval of AV data.

Figure 8:
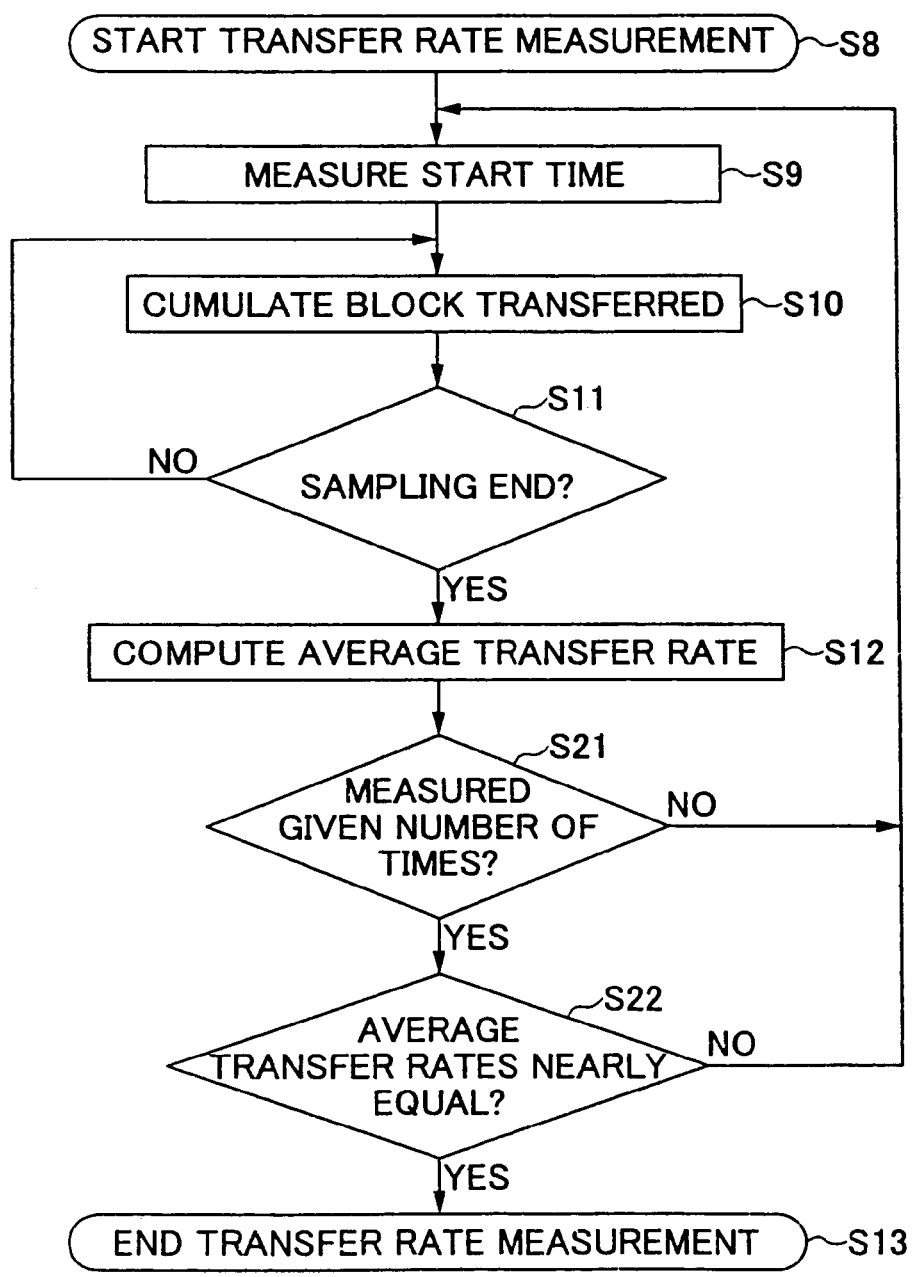
FIG. 8 is a flowchart of a transfer rate measurement process according to a sixth embodiment of the present invention.

A description will be given, with reference to FIG. 8, of a sixth embodiment of the present invention, which is also directed to improving the measurement of the average transfer rate necessary for realizing the first through third embodiments of the present invention. More particularly, the sixth embodiment provides a specific application with the process of measuring the average transfer rate. Such a specific application is such that, when the user designates a reproduction skip during retrieval of AV data at a low rotation velocity, data involved in the skip is read at one time and is stored in a buffer memory of the host 1.

After the measurement of the average transfer rate is started (S8), the number of blocks transferred to the host 1 by the read request from the user is counted (S10). It is determined whether the cumulative number of blocks has been sampled by the predetermined number of blocks (S11). If the cumulative number of blocks has not reached the predetermined number of blocks (N of S11), the sampling is continuously performed. In contrast, if the sampling is completed (Y of S11), it is determined whether computation of the average transfer rate has been performed by a predetermined number of times equal to one set (S21). If the measurement has not yet been performed by the predetermined number of times (N of S21), the measurement of the average transfer rate is continued (S9). In contrast, if the measurement of the average transfer rate has been performed by the predetermined number of times (Y of S21), it is determined that the average transfer rates obtained by executing the measurement several times are close to each other (S22). If the rages are close to each other (Y of S22), these values are recognized to be valid and the measurement of the average transfer rate is ended (S13). In contrast, if there is a large difference between the average transfer rates (N of S22), these values are recognized to be invalid and the measurement of the average transfer rate is restarted (S9).

Thus, according to the sixth embodiment of the present invention, the average transfer rates obtained by performing the measurement several times are handled as one set and the validity thereof is judged. If the average transfer rates of the set are close to each other, the average transfer rates are recognized to be valid. That is, the valid average transfer rate is defined based on condition that the average transfer rates obtained several times are close to each other. This improves the reliability of the average transfer rate and copes with a temporary change of the transfer rate such that the average transfer rate is temporarily raised due to the application.

Figure 9:
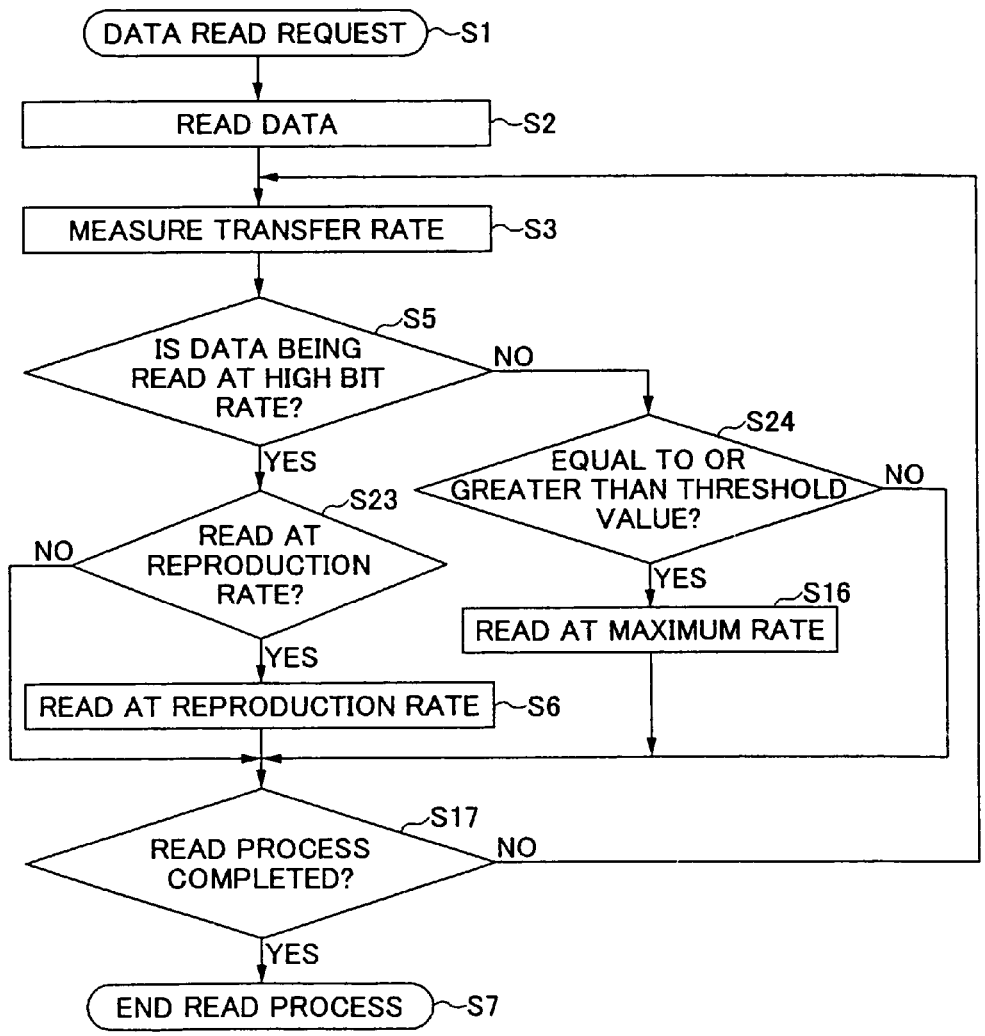
FIG. 9 is a flowchart of a read process control according to a seventh embodiment of the present invention.

A description will be given, with reference to FIG. 9, of a seventh embodiment of the present invention, which may, for example, be applied to the aforementioned third embodiment of the present invention.

When a data read request is received from the user (S1), reading of data is started (S2). Next, the average transfer rate is measured (S3). Then, it is determined that data is being read at the maximum rate (S5). If data reading is being performed at the maximum rate, it is determined whether the measured average transfer rate is equal to or lower than a predetermined threshold value M (S23). The process of step S23 is executed as a function of comparing means. If the average transfer rate measured is neither equal to nor lower that the threshold value M (N of S23), the data is read at the same bit rate. In contrast, if the average transfer rate is equal to or lower than the threshold value M (Y of S23), the read rate is lowered to a predetermined reproduction rate and data is read there at (S6).

In contrast, if data is not read at the maximum rate (N of S5), it is determined whether the measured average transfer rate is equal to or greater than a predetermined threshold value N (S24). The process of step S24 is executed as a function of the comparing means. In the present embodiment, the threshold values M and N are different from each other so that M<N. If the average transfer rate does not exceed the threshold value N (N of S24), reading of data is continued at the same rate. In contrast, if the average transfer rate exceeds the threshold value N (Y of S24), the read rate is changed to the maximum rate at which data is read (S16). Thereafter, if the read process is not completed (N of S17), the average transfer rate is continuously measured (S3). If the read process is completed (Y of S17), the process is ended (S7).

As described above, according to the present invention, the threshold value M for lowering the rotation velocity of the information medium 3 is set greater than the threshold value N for raising the rotation velocity of the information medium 3 (N>M). This makes it possible to avoid a problem that lowering and raising of the rotation speed of the information medium are repeatedly performed at the time of reading at a transfer rate close to the threshold value although the data transfer rate requested by the user is close to the threshold value for switching the rotation velocity of the information medium.

Figure 10:
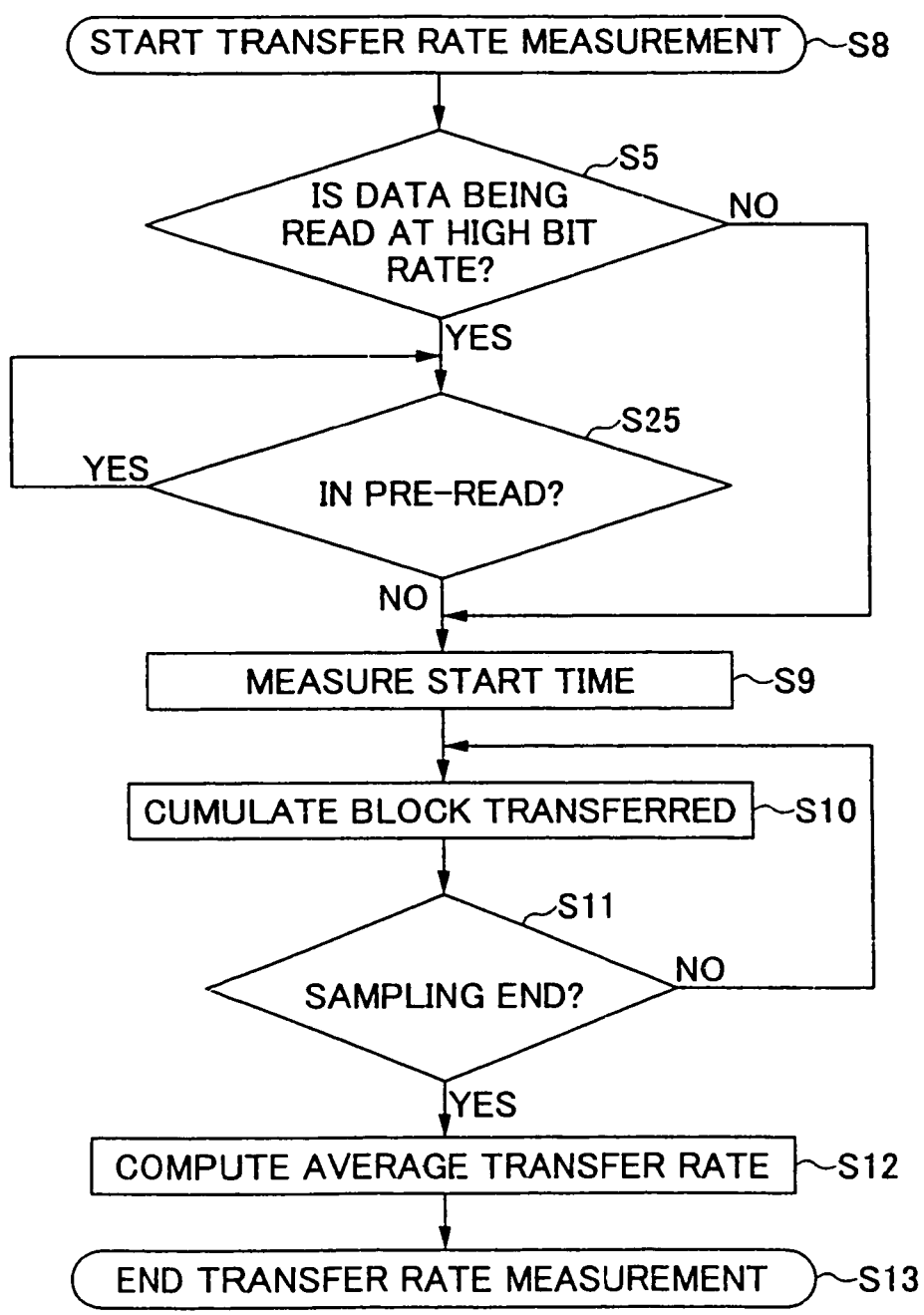
FIG. 10 is a flowchart of a transfer rate measurement process according to an eighth embodiment of the present invention.

A description will be given, with reference to FIG. 10, of an eighth embodiment of the present invention, which is directed to preventing the performance from being degraded due to the process of measuring the average transfer rate necessary for realizing the aforementioned embodiments of the present invention.

More particularly, generally, the optical disc drive 2 has a buffer called cache memory 8 therein, and data is pre-read and stored in the cache memory 8. When a read request is issued from the host 1, the optical disc drive 2 reads the requested address on the information medium 3, and transfers data to the host 1. Then, the optical disc drive 2 ends the process necessary for the read request. Here, the reading itself is not interrupted, but is continued so that data is stored in the cache memory 8 (look-ahead caching process). The caching is terminated when the cache memory is full of data. According to the pre-reading process, data in the cache memory 8 is merely sent back to the host when a read request is successively issued without accessing the information medium 3. Hence, the speeding up of read process can be attained.

When the measurement of the average transfer rate is started (S8), it is determined whether data the reading is performed at a high rate (S5). If data is not being read at a high rate (N of S5), the start time of measurement of the average transfer rate is measured (S9), and sampling of transfer blocks is initiated (S10).

In contrast, if data is being read at a high rate (Y of S5), it is determined whether the cache memory 8 has a free space and the pre-reading process is being performed (S25). If the pre-reading process is being performed (Y of S25), the start time of measurement of the transfer rate is measured (S9) as ordinary after the pre-reading process is completed (N of S25). Then, sampling of transfer blocks is initiated (S10). Then, it is determined whether the cumulative number of blocks has reached the predetermined number of blocks (S11). If the sampling of the predetermined number of blocks has not yet been completed (N of S11), the sampling is continued (S10). In contrast, if the sampling has been completed (Y of S11), the average transfer rate is computed based on the transfer rate measurement time starting from the start time and the number of transferred blocks (S12) and ends the measurement of the average transfer rate (S13).

If a free space is available in the cache memory 8, data is pre-read. A situation in which the cache memory 8 becomes full of data in the data pre-reading process while information is read at the maximum rate means that the read from the user is slower than the read rate of the optical disc drive 2. Therefore, in the case where information is read at the maximum rate, measurement of the average transfer rate is started at the time when the cache memory 8 becomes full of data and the data pre-reading process is completed (N of S25). It follows that there is no need to measure the average transfer rate meaninglessly while information is being read at the maximum rate and that degradation of the performance in the read process can be avoided. At the time of reproducing AV data or the like, the average transfer rate is originally low, and the pre-reading process is completed after the cache memory 8 is full of data. Hence, measurement of the transfer rate is initiated as it stands (N of S5, S9).

The present invention is not limited to the specifically disclosed embodiments, and variations and modifications may be made without departing from the scope of the present invention.

The present application is based on Japanese Priority Application No. 2000-185120 filed on Jun. 20, 2000, the entire contents of which are hereby incorporated by reference.

What is claimed is:

1. An information reproducing apparatus comprising:
a motor rotating an information medium; and
a reading unit reading information from the information medium,
wherein a first rotation velocity of the information medium determined when a data reproduction request of AV data is received is higher than a second rotation velocity of the information medium determined when a data ripping request is received.

2. A system comprising:
a personal computer coupled electrically to an optical disc drive and providing a read data request to said optical disc drive;
said optical disc drive having a motor rotating an optical disc and further having an optical pickup, and said optical disc drive responding to a receipt of said read data request from the personal computer to cause said optical pickup to read information from the optical disc while said motor rotates the optical disc, and said optical disc drive providing information read from said optical disc to said personal computer;
said personal computer providing, in response to receiving information read from the optical disc following receipt of said read request by the optical disc, information indicative of a rate at which the personal computer receives information read from the optical disc;
said personal computer testing said rate and, in response to said testing, selectively adjusting said rotating and thereby adjusting a rate at which information read from the optical disc is thereafter provided by said optical disc drive to said personal computer.

\* \* \* \* \*